March 2, 1943.  C. G. STRANDLUND  2,312,372
PLOW
Filed Jan. 8, 1940  3 Sheets-Sheet 1

INVENTOR:
Carl G. Strandlund
BY
ATTORNEYS.

March 2, 1943.   C. G. STRANDLUND   2,312,372
PLOW
Filed Jan. 8, 1940   3 Sheets-Sheet 2

INVENTOR:
Carl G. Strandlund
BY
ATTORNEYS.

Patented Mar. 2, 1943

2,312,372

UNITED STATES PATENT OFFICE 2,312,372

PLOW

Carl G. Strandlund, Moline, Ill., assignor to Deere & Company, Moline, Ill., a corporation of Illinois Application January 8, 1940, Serial No. 312,830

14 Claims. (Cl. 97—113)

The present invention relates generally to agricultural implements and is more particularly concerned with a new and improved plow bottom which forms the essential part of a moldboard plow for lifting, turning, and inverting the soil. As heretofore constructed, the conventional plow bottom comprises a share having a forward cutting edge and a point, a curved moldboard, a landside, and a frog to which the share, landside and moldboard are attached. The share, which provides the cutting edge and the point and which, in general, serves as a wedge which is forced through the soil ahead of the moldboard and serves principally to cut or lift the furrow slice from the unplowed furrow, has heretofore been made detachable since it is the part of a plow which receives the most wear and which therefore must be sharpened or replaced at more or less frequent intervals.

In my co-pending application, Serial No. 293,437, filed September 5, 1939, I disclosed a new form of plow in which, in effect, the point of the share at the landside marginal portion of the moldboard is replaced by an arcuate bar of wear-resisting steel or the like which is sharpened at its lower end and, moreover, is adjustable downwardly and forwardly about its support on the frog of the plow so as to permit the bar to be adjusted to the proper position as the sharpened point wears off. This adjustable bar preferably is formed as a rolled section and is therefore a relatively inexpensive part, yet its use results in a plow bottom which not only can be sharpened with materially less cost than conventional plow shares, but also the plow can be used practically twice as long between sharpenings.

The present invention is an improvement upon a plow bottom of this type.

The object and general nature of the present invention is the provision of a plow bottom having a combined plow point and shin member in the form of an arcuate bar, the upper and lower surfaces of which are generally parallel. A further feature of the present invention is the provision of a plow point in the form of an arcuate bar of materially greater thickness than the moldboard which cooperates therewith, the frog supporting both the arcuate bar and the moldboard being formed with an offset section to receive and support the arcuate bar so that the upper surface of the latter lies substantially flush with the landside section of the moldboard. In this connection it is a further feature of my invention to provide an arcuate bar as a plow point, having a conical upper surface, the angle of which is relatively small so as to correspond generally to the angular disposition of the share, which it will be remembered serves principally as a wedge for opening a furrow and initially separating the furrow slice from the unplowed soil, the moldboard being crowned, or formed with a convex surface, adjacent the arcuate bar, the degree of crown or forward curvature being such that the relatively greater angled moldboard surface connects with the conical surface at the upper portion of the arcuate bar in a smooth continuous curve which not only accommodates the use of an arcuate adjustable bar but, in addition, provides a surface for turning and inverting the furrow slice which scours easily in sticky soils, the relatively large degree of crown in the moldboard adjacent the bar establishing a moldboard shape in which the soil of the furrow slice bears with a substantially uniform pressure against said surface. Tests have shown that a moldboard shape in which there is a relatively large amount of crown fairly close to the landside portion of the plow results in improved scouring qualities which are not present in conventional plows, not excluding those in which there is a slight crown in the central portion of the moldboard surface. It is, therefore, another feature of the present invention to provide a moldboard plow having a moldboard surface of the above characteristics.

Another important feature of the present invention is the provision of a moldboard plow having means for removing a portion of the furrow slice, or a portion of the soil from which the furrow slice is severed, directing the same rearwardly over the landside section of the moldboard and depositing it in the corner of the furrow which the plow forms. More particularly, it is a feature of the invention to provide means to this end which comprises an arcuate bar having a flat or substantially flat upper surface, that is, a surface that is either cylindrical or a slightly conical surface. The cylindrical surface will direct a thin ribbon of soil directly rearwardly while the surface that has a slight inclination will direct the soil somewhat to one side or the other, or to both sides in the event that the bar has a slightly conical surface at each side and hence is symmetrical about an axis transverse to the section of the bar. In that event the bar would be reversible, provided the lower surface of the bar were also symmetrical. It is a further feature of the present invention to provide an arcuate bar of this type in which both the upper and lower surfaces are cylindrical, or of some other shape which is symmetrical. As will be clear from the detailed description below, the cross section of the bar may take several shapes.

One of the principal advantages of providing means for removing a thin ribbon of soil from the furrow slice and directing the thin ribbon directly rearwardly is that the jointer, which is especially useful in trashy soil, may be eliminated.

These and other objects and advantages of the present invention will be apparent to those skilled in the art after a consideration of the following detailed description taken in conjunction with the accompanying drawings, in which.

Figure 1:
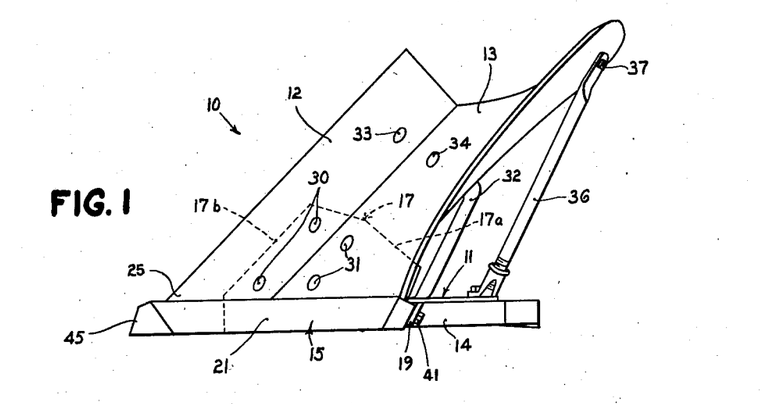
Figure 1 is a plan view of a plow bottom embodying the principles of my invention.
Figure 2:
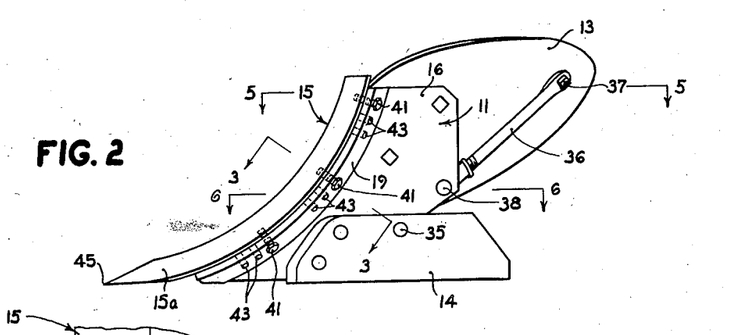
Figure 2 is an elevational landside view of the plow bottom shown in Figure 1.
Figure 3:
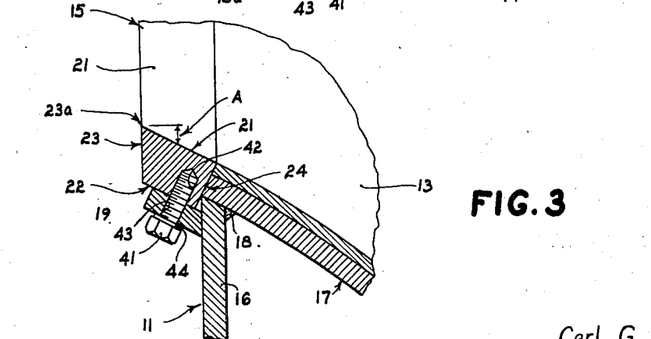
Figure 3 is a sectional view drawn to a larger scale and taken along the line 3—3 of Figure 2, showing the preferred way of securing the combined point and shin member to the frog of the plow bottom.

Referring now more particularly to Figures 1, 2 and 3, the plow bottom in which the principles of the present invention have been incorporated is indicated in its entirety by the reference numeral 10. The plow bottom comprises a frog 11 on which is supported a share blade 12, a moldboard 13, a landside 14 and a combined shin and ground breaking point 15. The frog 11 is fabricated from steel plates and comprises one plate 16 lying in a generally fore and aft extending vertical plane when the plow is in normal operating position, and a curved plate 17 which is disposed transversely of the vertical plate 16 and is welded, as at 18, thereto along the forward edge thereof. If desired, of course, the landside section 16 of the frog 11 and the section 17, at least a portion of which forms the moldboard receiving section of the frog, may be made from one integral piece or sheet. The moldboard receiving section of the plate 17 is indicated at 17a, and the lower part of the plate 17 is arranged to receive and support the share blade 12, the portion of the plate 17 receiving the share blade 12 being indicated at 17b (Figure 1).

The combined point and shin member 15 consists of a bar or shin curved in a circular arc and disposed with its concave side facing upwardly. More detailed description of the cross sectional form of the bar will appear later. The bar 15 is supported on a ledge plate 19 which is of the proper shape and is welded or otherwise secured to the landside plate 16. If desired, of course, the bar or shin receiving support 19 and the share blade and moldboard supporting section 17 may be formed integrally and welded or otherwise fixed to the landside section 16 of the frog 11. Other possible variations of this feature of my invention will be apparent to those skilled in this art.

The bar or shin 15 is supported on the frog with the lower end of the bar projecting forwardly therefrom in the form of an unsupported section indicated in Figure 2 by the reference numeral 15a, since it is not practical to extend the point of the frog 11 as far forward as the point of the arcuate bar 15. As will be clear from Figure 3, the bar 15 is of substantial thickness, and hence is of the required strength to permit the ground breaking point section 15a of the bar to extend forwardly beyond the point of the frog 11. However, the bar receiving support 19 of the frog 11 is offset below the adjacent portion of the moldboard receiving part of the plate 17 a distance sufficient to dispose the upper surface of the bar 15 substantially flush with the adjacent portions of the moldboard 13. In the form of the invention shown in Figure 3, the cross section of the bar 15 is a trapezoid, the upper and lower surfaces 21 and 22 being parallel and the landside and moldboard edges or sides 23 and 24 being convergent. The upper and lower surfaces 21 and 22 of the bar 15 are conical, being generated by two lines parallel to one another and rotated about an axis of generation which is disposed normal to the landside of the plow bottom, such axis being common to the two surfaces 21 and 22. The side face or edge 23 of the bar 15 is planar, lying in a vertical plane which extends forwardly in the line of draft and at right angles to the axis of generation of the surfaces 21 and 22. The axis of curvature of the bar 15 also coincides with the axis of generation of the surfaces 21 and 22. Similarly, the upper surface of the bar receiving ledge 19 is also conical about the same axis of generation, since the upper surface of the ledge 19 should conform to the surface 22 which rests against it. The conical surface 21 intersects the plane of the landside face 23 of the bar 15 at an acute angle and forms a sharp edge 23a which serves as the ground cutting front edge, or shin, of the plow bottom 10. The upper face 21 inclines outwardly and rearwardly from the cutting edge 23a and is flush with the surfaces of the share 12 and moldboard 13 which abut against the side 24 of the bar 15. More particular reference to the form of the moldboard surface will be made below. It will be noted, however, from Figure 3, that the surface 24 and the abutting edge of the moldboard 13 are perpendicular to the front face 21 of the bar 15, that is to say, the edge 24 lies in a conical surface, the axis of generation of which coincides with the above-mentioned axis, with the elements of the last mentioned conical surface disposed at right angles to the elements of the conical surface in which the upper face 21 of the bar 15 lies. As more particularly pointed out in my co-pending application, identified above, by making the abutting surface 24 perpendicular to the upper face 21, at least two distinct advantages are obtained. First, the joining edge of the share blade 12 can be cut perpendicular to its working face, thus involving a simple shearing operation during manufacture instead of a more complicated beveling operation as would be necessary if the abutting face 24 were disposed at another angle. Second, an advantage of this construction is that it provides a small amount of overlap of the bar 15 with respect to the adjoining edge of the share blade 12, thus having the effect of restraining the front corner 25 of the blade 12 from being curled rearwardly and upwardly when an obstruction is encountered during operation.

The share blade 12 is supported on the outwardly and rearwardly inclined portion 17b of the plate 17, which forms a part of the frog 11. The frog section 17b underlies the share blade and is secured thereto by any suitable means, such as bolts 30. The moldboard is also supported on the plate 17 and is held in abutment with the share blade 12 and the bar 15 by means of plow bolts 31. The outer ends of the share blade and moldboard are rigidly braced against the frog by means of a bracing member 32 which is secured to the share blade and moldboard by plow bolts 33 and 34, respectively, and to the vertical landside plate 16 by means of a plow bolt 36. The outer upper corner of the moldboard is rigidly braced by means of an extensible bracing rod 36 of more or less conventional construction, one end of which is bolted to the corner of the moldboard by a plow bolt 37 and the opposite end of which is bolted to the vertical landside plate 16 by a plow bolt 38.

Since the upper surface of the bar receiving member 19 and the lower surface 22 of the bar lie in surfaces of revolution, the axis of generation being disposed perpendicular to the landside edge or face 23 of the bar 15, the latter may be formed as an arcuate member, as described above, and may be shifted downwardly and forwardly to various positions, as required, while the surface 21 remains constantly in the same position relative to the moldboard and share blade. To this end, the bar 15 is bolted to the member 19 by means of stud bolts 41 which are received by threaded sockets 42 recessed into the outer or lower side 22 of the bar 15. The bolts 41 extend through apertures 43 in the bar support ledge or flange 19 and the stud bolts 41 are locked against inadvertent loosening by means of suitable lock washers 44.

Figures 4, 5:
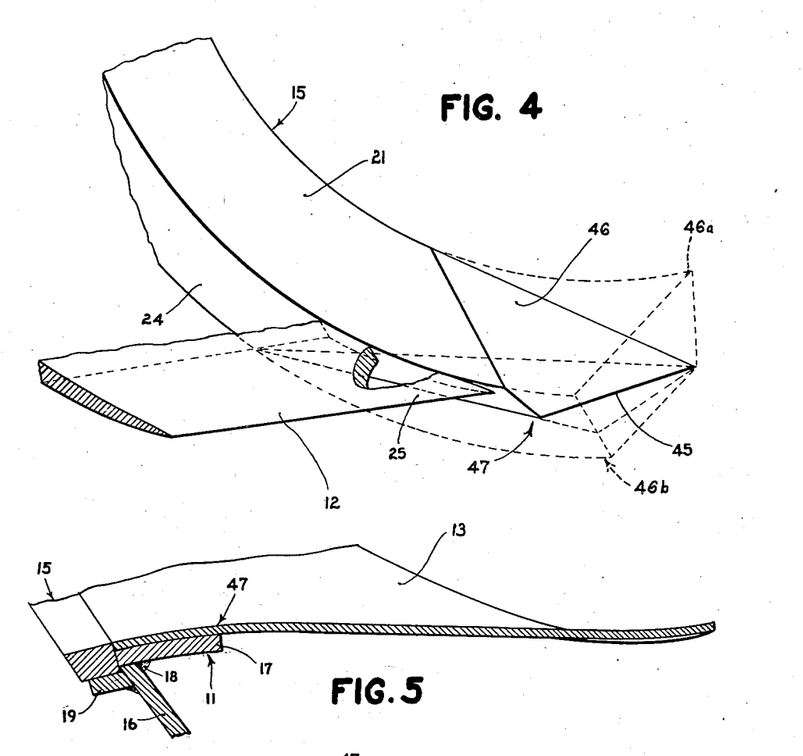
Figure 4 is a fragmentary perspective view of the lower end of the arcuate bar that constitutes the combined point and shin member, Figure 4 showing the manner in which a sharpened edge is formed on the lower end of the bar.
Figures 5 and 6 are sectional views taken generally along the lines 5—5 and 6—6, respectively, of Figure 2, showing the amount of crown formed in the moldboard adjacent the landside edge thereof.

In normal position the forward end of the bar 15 is substantially tangent to the ground. The bar 15 is provided with a sharp penetrating edge 45 which serves as the point proper of a plow bottom. The sharpened penetrating edge 45 is made as follows, referring particularly to Figure 4 in which the dotted lines show the original trapezoidal formation of the lower end of the bar 15. The upper side of the sharpened edge 45 is formed by beveling the upper portion of the lower end of the bar 15, either by pounding, grinding, or any other suitable method, on a plane which is inclined upwardly, laterally and rearwardly, forming the upper side 46 of the sharpened end of the bar 15. The section indicated at 46a in Figure 4 represents the amount of material removed or otherwise worked to produce the upper part of the sharpened section of the bar. Due to the fact that the lower surface 22 of the bar 15 is not a cylindrical surface but is a conical surface, the lower furrowward intersection of the two surfaces 22 and 24 extends somewhat below the horizontal plane of the sharpened edge 45, hence, the section indicated at 46b has to be removed in order that the cutting edge may lie in a horizontal plane. As a result of removing, as by grinding or otherwise, the sections 46a and 46b of the bar 15, the lower sharpened end 45 thereof lies at the forward portion of a generally triangular horizontally disposed surface 47 (Figure 4). In effect, this reduces the vertical dimension of the moldboard face 24 at the forward end of the bar 15, this portion of the face 24 receiving the landside edge of the share blade 12. A portion of the share blade 12 is shown in Figure 4 to illustrate the relation between these two parts. From Figure 4 it will be seen how the lower forward corner 25 of the blade engages underneath the overhanging portion of the side 24 of the bar 15. It will also be seen from Figure 4 that the surface 46 is disposed in a plane which is inclined upwardly and rearwardly from the cutting edge 45 and also inclined at a slight angle rearwardly from the landside corner of the cutting edge 45, whereby the latter is not disposed exactly transversely with respect to the line of advance but angles laterally and rearwardly corresponding more or less generally to the angle of the cutting edge of the share blade 12, as shown in Figure 1.

During ground working operation, the cutting edge 45 will, of course, gradually become dull. When this occurs, the bar can be easily sharpened by removing the latter from the plow bottom, as by loosening and withdrawing the three studs 41, and then grinding or otherwise forming a new bevel 46 on the front end of the bar, grinding or otherwise forming the lower edge 47 if necessary. It is obvious that each time the bar is resharpened it is slightly shortened, and consequently after a few sharpening operations, the front edge 45 of the bar will have receded until it is no longer tangent with the plane of the ground. To correct this condition, provision is made for adjusting the bar downwardly and forwardly along the supporting ledge 19, it being remembered that the upper surface of this part lies in a surface of revolution. To this end the supporting ledge 19 is formed with a plurality of apertures 43 (Figure 2), and by inserting the studs 41 in the more downwardly disposed openings 43, the bar 15 may be disposed in its new position. Since the bar 15 is arcuate about the same transverse axis which constitutes the axis of generation of the surfaces 21 and 22 and the upper surface of the ledge 19, the bar 15 can be returned to its original position by sliding the same about its support on the ledge 19 to the various positions required, depending upon how many times the bar is sharpened.

Figure 6:
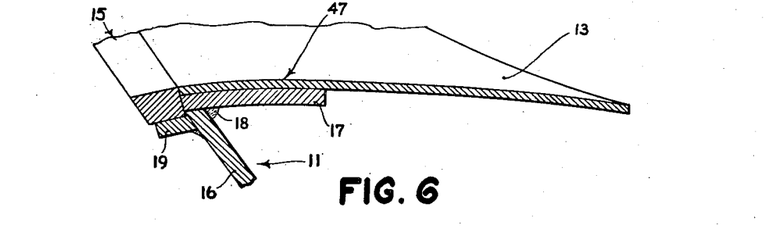

Reference was made above to the fact that the principal function of the share blade 12, at least the forward cutting portion thereof, is to serve as a wedge initially separating the furrow slice from the unplowed soil. To this end, the angle which the share blade 12 makes with respect to the horizontal is relatively small, and in order to have a comparatively smooth continuous surface from the landside face 23 of the bar 15 at the lower end thereof over to the share blade 12, the angle of the conical surface 21 is relatively small, this angle being indicated by the letter A in Figure 3. Since the upper face 21 lies in a conical surface generated by the rotation of a line disposed at the angle A with respect to the axis of generation, the forward or upper surface 21 of the bar 15 has the same angular position as the lower portion. However, at the upper part of the bar 15 the moldboard 13 extends rearwardly and laterally at an angle which is materially greater than the angle A. In order, therefore, to provide a smooth flowing continuous surface from the shin edge 23a to the wing of the moldboard, the latter is formed with a shape indicated in the profile views of Figures 5 and 6. From these figures it will be seen that the moldboard 13 is provided with a high crown or forwardly convex curvature, indicated in Figures 5 and 6 by the reference numeral 47. It will also be noted that the crowned section 47 is closely adjacent to the bar 15, the degree of crown or curvature being appreciably more, higher up on the moldboard, as in Figure 5, than lower down, as in Figure 6. However, at both sections, the degree of crown is materially greater than the ordinary plow bottom moldboard. The advantage of this particular construction is twofold. In the first place, it affords a smooth surface leading from the slightly angled conical surface 21 over to the more sharply angled moldboard which extends laterally and rearwardly. In the second place a moldboard having this shape results in markedly improved scouring, especially in sticky soil. As presently understood, the high crowned section 47 of the moldboard adjacent the landside edge results in substantially equal pressure of the soil against all parts of the moldboard. Equal pressure at all parts, as will be understood, results in a plow in which there are no sections of reduced pressure, and hence there is little opportunity for soil to stick to the moldboard and interfere with scouring. From Figures 5 and 6 it will also be noted that the degree of crown or convex forward curvature increases toward the upper portion of the moldboard, being somewhat smaller in the lower portion thereof, as shown in Figure 6.

The share blade 12 can also be easily removed for sharpening by loosening and removing the bolts 30 and 33. The sharpening of the share blade 12 is a simpler operation, in view of the absence of the point on the share blade, than the sharpening of a conventional plow share. Hence, replacement shares are also less expensive. The landside member 14 is of substantially the same construction as in my co-pending application identified above, and therefore a further description is believed to be unnecessary.

Figures 7, 13:
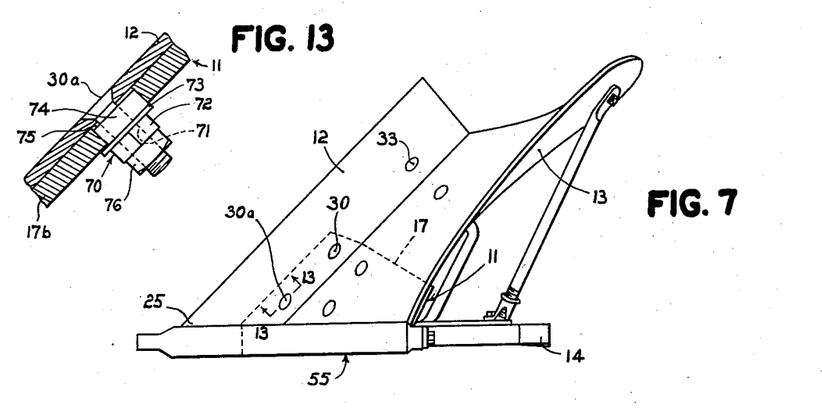
Figure 7 is a view similar to Figure 1 but showing a modified form in which the combined point and shin member is in the form of a substantially square bar having upper and lower cylindrical surfaces.
Figure 13 is a section taken along the line 13—13 of Figure 7.
Figure 8:
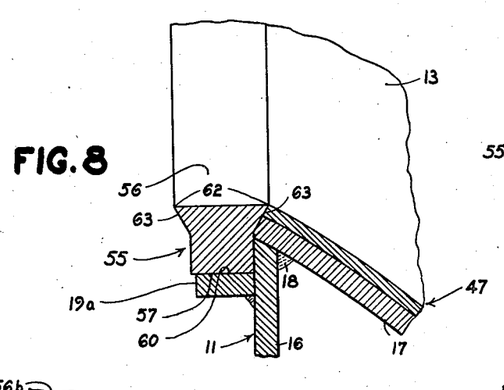
Figure 8 is a sectional view of the arcuate bar construction shown in Figure 7 and corresponding to the sectional view shown in Figure 3.

The plow bottom shown in Figures 7 and 8 is quite similar to the plow bottom described above, with this exception, namely, that the arcuate bar is formed with a cylindrical upper and forwardly facing surface, as a result of which the bar separates a portion of the soil from the main body of the furrow slice and from the unplowed ground, and directs the same rearwardly over the moldboard, depositing it in the corner of the furrow which the plow bottom forms. A part of this thin ribbon of soil may fall on the land to the rear of the plow. In either event, it will be seen that this thin ribbon of soil will be completely covered up on the next round. This feature is of particular importance when plowing in trashy soil and enables the plow to do a clean job of trash covering which is at least equal to or superior to a conventional plow bottom when equipped with a jointer.

Referring now more particularly to Figures 7 and 8, the moldboard, the share blade, and the frog are of substantially the same construction described above, and hence the same reference numerals have been applied. However, the bar which makes up the combined point and shin member is of somewhat different construction. As best shown in Figure 8, the combined point and shin member of this modification comprises a bar 55 of substantially square cross section. The upper or radially inner surface of the bar 55 is indicated at 56 and the lower or radially outer surface at 57. These surfaces are parallel and cylindrical, with a common axis of generation. The bar 55 is arcuate with about the same curvature as the bar 15 described above. Since the surface 57 is cylindrical, the bar supporting ledge or plate also has a cylindrical bar receiving surface, indicated by the reference numeral 60. Other than being a cylindrical member, the bar supporting part 19a is substantially the same as the corresponding part 19 in Figures 1 to 3. The bar 55 is sharpened in substantially the same way as described in my co-pending application identified above. Since the lower surface 57 is cylindrical, it is not necessary to sharpen the lower surface at the lower end of the bar, as is necessary for the bar 15 shown in Figure 4. The bar 55 is formed with two overhanging sections 62 which are formed to have a lateral surface 63 disposed at an angle corresponding to the square shear cut at the landside edge of the moldboard 13. The relatively high crown 47 in the latter aids in connecting the relatively rearwardly angled moldboard surface with the forwardly facing flat surface 56 on the bar 55.

It will be noted that the bar 55 has a section that is symmetrical about the transverse axis that lies in the plane of curvature of the bar. Therefore, the latter may be reversed end for end, and hence the bar may be sharpened at both ends, if desired.

Figure 9:
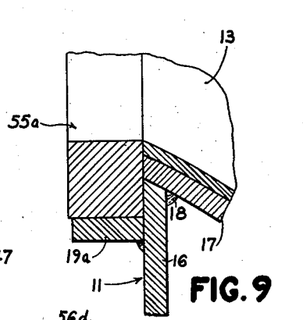
Figures 9 to 12, inclusive, show modified forms of arcuate bars, the forms shown in Figures 8, 9 and 12 being reversible.
Figure 10:
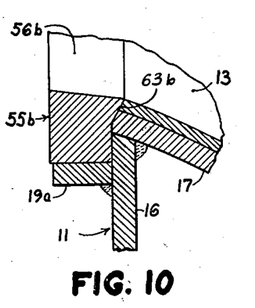
Figure 11:
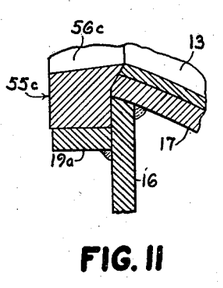
Figure 12:
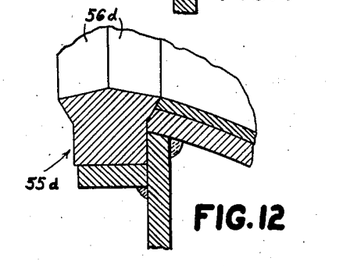

When in operation, the square bar 55 severs a portion of the furrow from the furrow slice and directs the same rearwardly and upwardly over the top of the plow. This thin ribbon of soil is deposited in the landside corner of the furrow formed by the plow or on the land adjacent the furrow. This materially improves the covering ability of the plow bottom since the portion of the furrow slice that might ordinarily expose some trash after the furrow slice has been turned and inverted by the plow bottom is deposited in a place where it is entirely covered by the next succeeding furrow slice. In other words, a plow having the combined point and shin member formed as shown in Figures 7 and 8, serves, for all practical purposes, as a plow bottom and a jointer. As will be readily understood, a jointer is an accessory in the form of a miniature plow fixed to the plow beam or the supporting structure in advance of the conventional plow bottom for the purpose of turning over a small ribbon-like furrow slice directly in front of the main plow bottom. This small furrow slice is cut from the upper side of the main furrow slice and is inverted, and then when the main furrow slice is inverted, trash that was on top of the soil is completely turned over and buried in the right hand corner of the furrow. It is the trash at the right side of the furrow slice (after inversion) that is not always adequately covered. The jointer just mentioned thus turns an additional amount of trash and also places it over toward the right side of the furrow slice (before inversion). In the plow bottom of the present construction, a corresponding ribbon-like strip of soil is severed from the furrow slice, somewhat in the nature of a jointer, but instead of placing it over toward the right side of the main furrow slice to be inverted therewith, this additional ribbon-like strip of soil is dropped over back behind the plow to be covered by the next round but without requiring that the same be inverted with the main furrow slice. The plow of the present construction therefore secures an adequate coverage of the trash, even under unfavorable circumstances, but without requiring the use of another part, such as a jointer.

Where it is convenient or feasible to provide the moldboard 13 and the share blade 12 with beveled landside edges, the overhanging portions 62, 63 shown in Figure 8 may be omitted and a bar 55a of square or rectangular cross section may be used, as shown in Figure 9. Figure 10 shows a bar 55b which is practically of square or rectangular cross section except that the forward face 56b is formed at a slight angle with respect to a transverse line and the shouldered section 63b has been provided so as to fit against the abutting landside edge of the blade and moldboard. The bar 55a shown in Figure 9 may be reversible, but the bar 55b shown in Figure 10 is not reversible. Figure 11 shows a bar 55c which is substantially the same as the bar shown in Figure 10 except that the flat surface 56c is angled in the other direction. Figure 12 shows a bar 55d which has the surface 56d formed with a double bevel so as to throw the thin ribbon of soil partly in one direction and partly in the other. The bar shown in Figure 12 is reversible or may be made reversible. The bars shown in Figures 9 to 12 may be sharpened more or less in the manner suggested in Figure 4, except that since the lower surface is cylindrical there is no triangular section to be removed, as is indicated at 46b in Figure 4. It will be understood, of course, that the lower or radially outer surface of the bar may be non-cylindrical, with the bar supporting member 19a on the frog of corresponding shape. Since the bars 55a in Figure 9 and 55d in Figure 12 are reversible, the lower surface of the bar should be one that is symmetrical about the center line of the section.

Under certain conditions the bolts 30 and 33 by which the share blade 12 is secured to the frog 11 and the brace 32, may in time wear to permit the blade 12 to shift out of position and extend sufficient to cause a gap between the forward point 25 of the share blade 12 and the forward end of the arcuate bar 15. This is objectionable in a plow where the point is separate from the share blade on account of the tendency of roots and the like to collect in the gap and prevent proper operation of the plow bottom. It is therefore a feature of the present invention to provide means for forcibly holding the forward point of the share blade 12 up against the forward end of the arcuate bar. In Figures 7 and 13 I utilize an eccentric washer 70 disposed about the shank of the inner plow bolt 30a, which may be somewhat longer than the companion plow bolt 30. The eccentric washer 70 is of substantially the same construction shown in my prior Patent No. 1,125,206. In the present instance, however, it is arranged differently than in the patent just mentioned. In the latter, the eccentric adjustment is arranged to shift the plow share almost directly rearwardly toward the landside and the moldboard. According to the present invention the adjusting eccentric is arranged to force the forward point of the share blade generally laterally and rearwardly toward the arcuate bar, indicated at 55 in Figure 7. Thus, in effect, the adjusting member 70 serves to close up the gap between the landside edge of the blade 12 and the arcuate bar 55 and keep the landside edge of the blade firmly against the undercut portion of the arcuate bar makes it practically impossible for soil pressure and the like to curl or bend up the point 25, which might occur if a gap were permitted to form between the landside edge of the blade 12 and the lower portion of the arcuate bar. At the same time the rear edge of the blade is held firmly against the lower edge of the moldboard. The manner in which this is accomplished will be pointed out below.

The present invention is, of course, not concerned with the particular detailed construction of the adjusting member 70 per se. It will therefore suffice to note that the member 70 consists of a washer or bushing having a bore 71 to receive the shank of the plow bolt 30a. The outer portion of the bushing 70 is squared, as at 72, and this portion is separated by a flange 73 from the eccentric section 74 of the bushing. From Figure 13, it will be noted that the eccentric section 74 is so formed that there is a small space 75 between the end of the eccentric 74 and the share blade 12. Thus, there is no binding when the flange 73 engages the underside of the frog 11. The bushing 70 is turned by engaging a wrench or other tool over the squared section 72. The parts are so arranged that when the blade 12 is shifted generally laterally and rearwardly, the blade is forced into firm engagement with the adjacent edge of the bar 55 and substantially closes up against the lower edge of the moldboard. There is sufficient yield in the parts to ensure tight engagement of the blade against the bar at all times. After the member 70 has been turned and the landside edge of the share blade 12 forced firmly against the arcuate bar, a lock nut 76, which is threaded onto the lower end of the plow bolt 30a, is tightened against the bushing 70, thereby holding all parts in position. As will be obvious, other forms of adjusting means for closing the gap between the share blade and arcuate bar may be employed.

While I have shown and described above certain details of construction, it is to be understood that my invention is not to be limited to the particular details shown in the drawings and described above, but that, in fact, widely different means may be employed in the practice of the broader aspects of my invention.

What I claim, therefore, and desire to secure by Letters Patent is:

1. In a plow, a moldboard, a frog having a moldboard receiving surface for supporting the moldboard, a combined point and shin comprising an arcuate member of bar stock of substantial thickness having upper and lower surfaces of revolution, means on said frog offset below said moldboard receiving surface and including a surface of revolution corresponding to the lower surface of revolution of said arcuate member for supporting said member in contact with the landside edge of said moldboard so that said arcuate member may be shifted downwardly about the center of revolution of said surfaces, said member being materially thicker than said edge of the moldboard, and means adjustably fixing said member to said frog.

2. A combined point and shin member for a moldboard plow having a share blade, comprising a generally arcuate bar having upper and lower conical surfaces with a common axis of generation, the moldboard edge of said bar being a conical surface the axis of which coincides with said first mentioned axis, said share blade having an edge that engages under the conical edge at the lower part of said bar.

3. A plow bottom comprising a frog having a moldboard receiving section and a landside section, a share, a moldboard fixed to said first section, a combined point and shin member extending downwardly and forwardly alongside the landside edges of the share and moldboard, comprising a relatively thick bar having upper and lower surfaces of revolution, the thickness of the bar being greater than the thickness of said moldboard, and means forming a bar receiving support on said landside section of the frog, said support having an upper surface of revolution extending downwardly and forwardly below the upper edge of said share and disposed below the moldboard receiving section of the frog, whereby the upper part of said combined point and shin member, when the latter is mounted on said support, is disposed substantially flush with the upper part of the moldboard and can be shifted downwardly and forwardly to adjust for wear, said bar extending a substantial distance forwardly of said frog and the bar receiving support thereof and terminating in an unsupported point section forward of the frog so that the latter is protected from wear, the thickness of said bar being sufficient to provide the requisite strength for said unsupported section.

4. A combined point and shin member for a plow having a share with a landside edge formed by a shear cut substantially perpendicular to the general plane of the share, comprising an arcuate bar having upper and lower concentric cylindrical surfaces, at least one side of said bar being undercut so as to form an overhanging section adjacent the upper cylindrical surface on at least one side of the bar adapted to fit against the edge of said share.

5. A plow bottom having a moldboard, a share blade, a landside, and a member disposed generally in the plane of said landside and having a forward point adapted to enter the ground, the upper surface of said member being formed to carry a portion of the soil upwardly over the landside and moldboard and deposit the same in the furrow opened by the plow bottom.

6. A plow bottom as defined in claim 5, further characterized by said member having an upper surface which is flatter in a lateral direction than said moldboard.

7. A plow bottom comprising a blade and moldboard extending laterally, rearwardly and upwardly from the landside portion of the plow bottom for cutting a furrow slice and depositing the same laterally and rearwardly into a previously opened furrow, and means at the landside portion of the plow bottom for removing a portion of the furrow slice and depositing it rearwardly, comprising a bar member adapted to penetrate the soil and having an upper face which extends upwardly and rearwardly from the forward end of the bar and is materially flatter horizontally than said blade and moldboard so as to carry said removed portion of the furrow slice upwardly and substantially directly rearwardly for depositing it in the furrow opened by the plow bottom rearwardly of the latter.

8. A plow bottom comprising a frog, a share blade fixed to the lower part of said frog and disposed to make a relatively small angle with a horizontal plane, a combined point and shin member comprising an arcuate bar disposed generally vertically and having an upper generally conical surface the angle of which corresponds to the angle of said share blade so that the upper face of the bar at the lower part thereof and the adjacent part of said blade form substantially a continuous surface adapted to sever a furrow slice from unplowed soil, and a moldboard secured to said frog above said share blade and joining the upper end portion of said arcuate bar, the moldboard being curved and extending laterally and rearwardly at a substantial angle to invert the furrow slice as the plow bottom moves forwardly, the portion of said moldboard adjacent said arcuate bar being crowned to an appreciably greater extent than the furrowward portion of the moldboard so as to present a forwardly convex surface which joins in a smooth curve with the conical surface of the upper end portion of said arcuate bar.

9. A plow bottom as defined in claim 8, further characterized by the degree of crown in said portion of the moldboard increasing toward the upper end of said arcuate bar.

10. A plow bottom comprising a frog having a moldboard receiving section and a landside section, a moldboard fixed to said first section, a combined point and shin member having upper and lower surfaces of revolution and extending downwardly and forwardly alongside the landside edge of the moldboard, comprising a relatively thick arcuate bar, the thickness of which is greater than the thickness of said moldboard, and means forming a bar receiving support on said frog below the moldboard receiving section of the latter having a surface of revolution to receive said arcuate bar, whereby the upper part of said member may be disposed substantially flush with the upper part of the moldboard and may be adjusted downwardly and forwardly with said upper surfaces remaining flush with one another.

11. A plow bottom of the moldboard type, comprising a frog having a moldboard receiving section, an arcuate bar generally in the landside plane of the plow and forming a combined point and shin member having upper and lower faces, both formed as surfaces of revolution about a common axis, the upper face having one portion that is substantially conical and a second portion disposed adjacent thereto and lying at an angle to said one portion, the furrowward edge of the bar being arcuate about said axis, said axis being substantially perpendicular to the vertical plane of forward travel of the plow bottom, said frog having a portion formed as a surface of revolution about said axis to receive the lower face of said bar, a moldboard fixed to the moldboard receiving section of said frog and having an edge arcuate about said axis fitting against the arcuate edge of said bar with the upper face of the moldboard flush with the adjacent face portion of said bar, forming therewith a smooth continuous surface, and means for adjustably fixing said bar to said bar-receiving portion of the frog in different positions thereon so as to provide for shifting said arcuate bar downwardly and forwardly about said axis, whereby the adjacent portions of said bar and moldboard remain substantially flush one with the other and maintain said continuous smooth surface in all adjusted positions of the bar on the frog.

12. In a plow, a frog having a moldboard-receiving section, a shin-receiving support, the upper surface of which lies in a surface of revolution, and a landside section formed separately from said moldboard-receiving section and said shin-receiving support and welded to said moldboard-receiving section and said shin-receiving support, said shin-receiving support being offset generally below the adjacent portion of said moldboard-receiving section.

13. In a plow, a frog having a moldboard-receiving section, a shin-receiving support, and a landside section formed separately from said moldboard-receiving section and said shin-receiving support and welded thereto, said shin-receiving support having an upper surface that lies in a generally cylindrical surface of revolution and is offset generally below the adjacent portion of said moldboard-receiving section.

14. In a plow, a frog having a moldboard-receiving section, a shin-receiving support, and a landside section formed separately from said moldboard-receiving section and said shin-receiving support and welded thereto, said shin-receiving support having an upper surface lying generally in a conical surface of revolution and the adjacent portion of the moldboard-receiving section having a surface disposed generally in a conical surface of revolution generally coaxial with respect to said first conical surface of revolution, said shin-receiving support being generally offset below the adjacent portion of said moldboard-receiving section.

CARL G. STRANDLUND.

CERTIFICATE OF CORRECTION.

Patent No. 2,312,372.　　　　　　　　　　　　　　　　March 2, 1943.

CARL G. STRANDLUND.

It is hereby certified that error appears in the printed specification of the above numbered patent requiring correction as follows: Page 6, second column, line 34, before the word "flush" insert --substantially--; and that the said Letters Patent should be read with this correction therein that the same may conform to the record of the case in the Patent Office.

Signed and sealed this 13th day of April, A. D. 1943.

(Seal)　　　　　　　　　　　　　　　　　　　　　　　Henry Van Arsdale,
　　　　　　　　　　　　　　　　　　　　　　Acting Commissioner of Patents.